United States Patent
Okamoto et al.

(10) Patent No.: US 6,192,307 B1
(45) Date of Patent: Feb. 20, 2001

(54) BRAKING FORCE CONTROL SYSTEM

(75) Inventors: Masaru Okamoto, Kanagawa; Yoshinori Yamamura; Taketoshi Kawabe, both of Yokohama, all of (JP)

(73) Assignee: Nissan Motor Co., Ltd., Yokohama (JP)

( * ) Notice: Under 35 U.S.C. 154(b), the term of this patent shall be extended for 0 days.

(21) Appl. No.: 09/372,682

(22) Filed: Aug. 12, 1999

(30) Foreign Application Priority Data

Aug. 19, 1998 (JP) .................................................. 10-232852

(51) Int. Cl.[7] ........................................................ B60T 8/32
(52) U.S. Cl. .............................. 701/70; 701/83; 303/155; 180/244; 188/24.14
(58) Field of Search ................................. 701/70, 71, 74, 701/78, 83, 84, 51, 54; 475/198; 477/34, 37, 40; 303/125, 152, 155; 180/244; 188/24.14

(56) References Cited

U.S. PATENT DOCUMENTS 4,989,149 * 1/1991 Mimura et al. ........................ 701/95
5,864,769 * 1/1999 Inagaki et al. ........................ 701/70

* cited by examiner

*Primary Examiner*—William A. Cuchlinski, Jr.
*Assistant Examiner*—Yonel Beaulieu
(74) *Attorney, Agent, or Firm*—Foley & Lardner

(57) ABSTRACT

A braking force control system is provided with a controller connected to a vehicle operating condition detector, an engine braking force actuator and a wheel braking force actuator. The controller determines a target total braking force on the basis of the vehicle operating condition, a target transmission ratio and a target engine output on the basis of the target total braking force and calculates an engine braking force on the basis of the vehicle operating condition. The controller extracts a fast component of a rate of change of the target total braking force and determines a target wheel braking force on the basis of the fast component. The controller controls wheel braking force actuator so as to correspond the wheel braking force to the target wheel braking force. Therefore, a total responsibility of the system is improved by enhancing a follow-up characteristic during a first half of a transient period.

19 Claims, 12 Drawing Sheets

BRAKING FORCE CONTROL SYSTEM

BACKGROUND OF THE INVENTION

The present invention relates to a braking force control system which is arranged to calculate a target total braking force for achieving a target vehicle speed and to generate a wheel braking force and an engine braking force so as to correspond the sum of them to the target total braking force.

A Japanese Patent Provisional Publication No. 7-81463 discloses a total vehicle power control apparatus which is arranged to set several target values for achieving a target total braking force and to execute a target value follow-up control of the target values. This apparatus is arranged such that the target total braking force is mainly achieved by a generable engine brake force and a remaining thereof is compensated by a wheel braking force. This apparatus is further arranged to increase a ratio of the wheel braking force in the total braking force for improving the responsibility of the target total braking force follow-up control.

SUMMARY OF THE INVENTION

However, this conventional braking force control system is required to further improve a follow-up characteristic of an actual total braking force with respect to the target total braking force.

It is an object of the present invention to provide an improved braking force control system which improves its total responsibility by enhancing a follow-up characteristic during a first half of a transient period.

A braking force control system according to the present invention is for a vehicle and comprises a vehicle operating condition detector, an engine braking force actuator, a wheel braking force actuator and a controller. The vehicle operating condition detector detects an operating condition of the vehicle. The engine braking force actuator varies an engine braking force. The wheel braking force actuator varies a wheel braking force applied to each wheel. The controller is connected to the vehicle operating condition detector, the engine braking force actuator and the wheel braking force actuator. The controller determines a target total braking force on the basis of the vehicle operating condition, a target transmission ratio and a target engine output on the basis of the target total braking force. The controller calculates an engine braking force on the basis of the vehicle operating condition. The controller extracts a fast component of the target total braking force. The controller determines a target wheel braking force on the basis of the fast component. The controller controls the wheel braking force actuator so as to correspond the actual wheel braking force to the target wheel braking force.

DETAILED DESCRIPTION OF THE INVENTION

Referring to FIGS. 1 to 11E, there is shown an embodiment of a braking force control system according to the present invention. The braking force control system is applied to a front-wheel drive vehicle.

Figure 1:
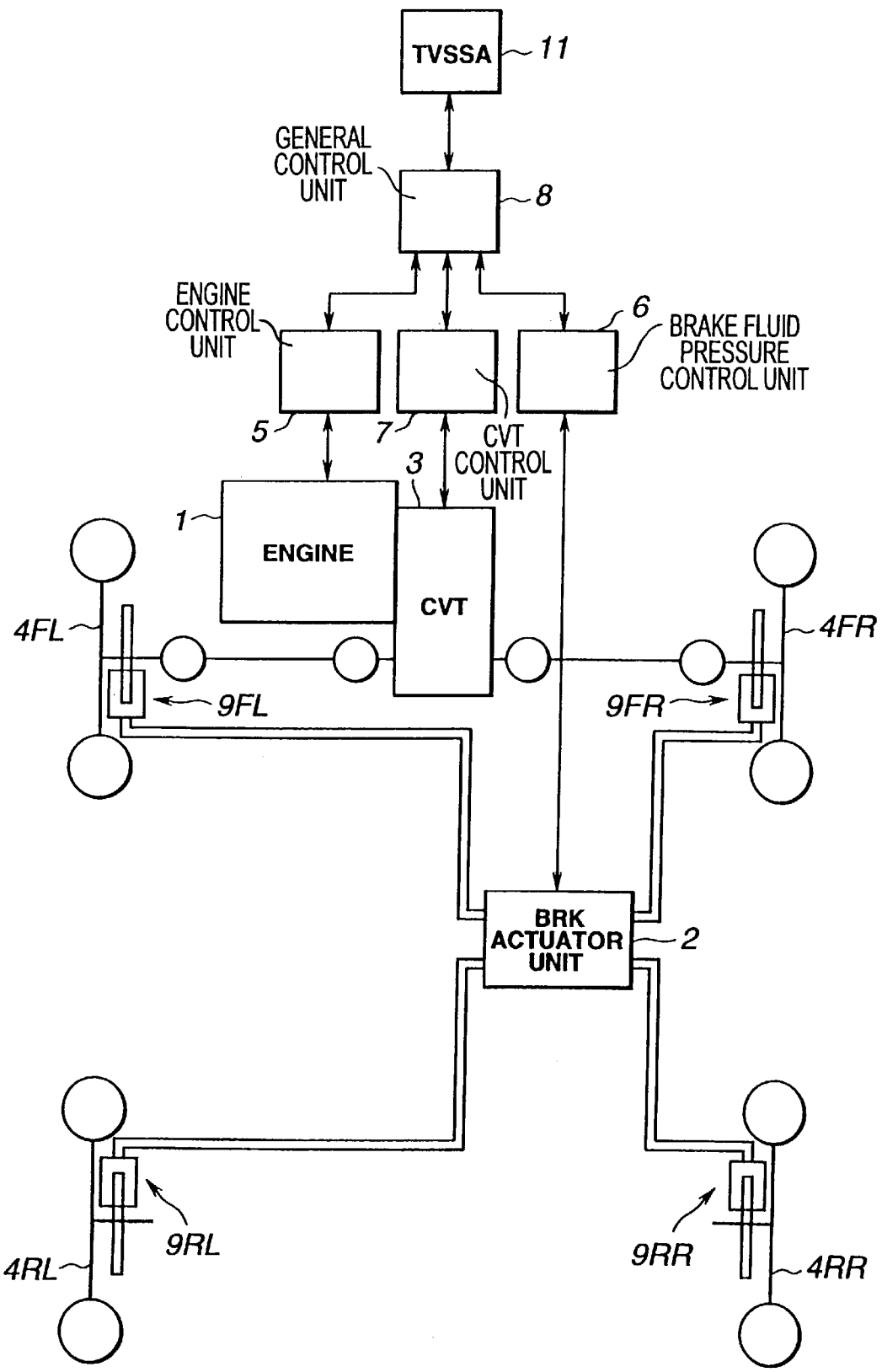
FIG. 1 is a schematic view showing a power train and a control system thereof.

As shown in FIG. 1, an output shaft of an internal combustion engine 1 is connected to an input shaft of a continuously variable transmission (CVT) 3 through a converter 10 (not shown in FIG. 1). An output shaft of the CVT 3 is connected to front left and right wheels 4FL and 4FR and drives them.

An engine control unit 5 is capable of independently controlling the engine 1. A CVT control unit 7 is capable of independently controlling the CVT 3. A brake fluid pressure control unit 6 is capable of independently controlling a brake pressure actuator unit 2 which controls brake fluid pressure to wheel cylinders 9FL, 9FR, 9RL and 9RR of the respective wheels 4FFL 4FR, 4RL and 4RR regardless a depression degree of a brake pedal. A general control unit 8 is electrically communicated (connected) with and totally controls the engine control unit 5, the brake fluid pressure control unit 6 and the CVT control unit 7. The general control unit 8 outputs a target throttle opening, a target braking fluid pressure and a target transmission ratio to the engine control unit 5, the brake fluid pressure control unit 6 and the CVT control unit 7, respectively as a command.

The engine control unit 5 controls control-quantities of the engine 1 to achieve the target throttle opening. The CVT control unit 7 controls control-quantities of the CVT 3 to achieve the target transmission ratio. The brake fluid pressure control unit 6 controls control-quantities of the brake pressure actuator unit (BRK actuator unit) 2 to achieve the target brake fluid pressure. The general control unit 8 receives a target vehicle speed from a target vehicle speed setting apparatus (TVSSA) 11 and determines a vehicle operating condition including a braking or driving force by which the target vehicle speed is achieved. The vehicle operating condition includes a transmission ratio of the CVT 3 and an engine output of the engine 1.

Further, the general control unit 8 calculates a target throttle opening and the target transmission ratio on the basis of the determined braking force and/or driving force. The target vehicle speed setting apparatus 11 is arranged to set a driver commanding vehicle-speed inputted by a driver as a target vehicle speed or to set a vehicle speed for keeping a vehicle-to-vehicle distance to a preceding vehicle as a target vehicle speed. Further, the target vehicle speed setting apparatus 11 executes a limiting operation for limiting a change of rate of the target vehicle speed so as to prevent the change rate (rate of change) of the target vehicle speed from becoming excessively large and small even if the target vehicle speed is radically changed. More specifically, the limiting operation functions such that absolute values of the acceleration and deceleration of the vehicle takes a value smaller than a predetermined value.

A wheel braking apparatus connected to each of the wheel cylinders 9FL to 9RR is a common disc brake unit in which a disk attached to each of the wheels 4FL, 4FR, 4RF and 4RR is slowed by the friction of disk pads pressed by calipers against each side of disks.

Figure 2:
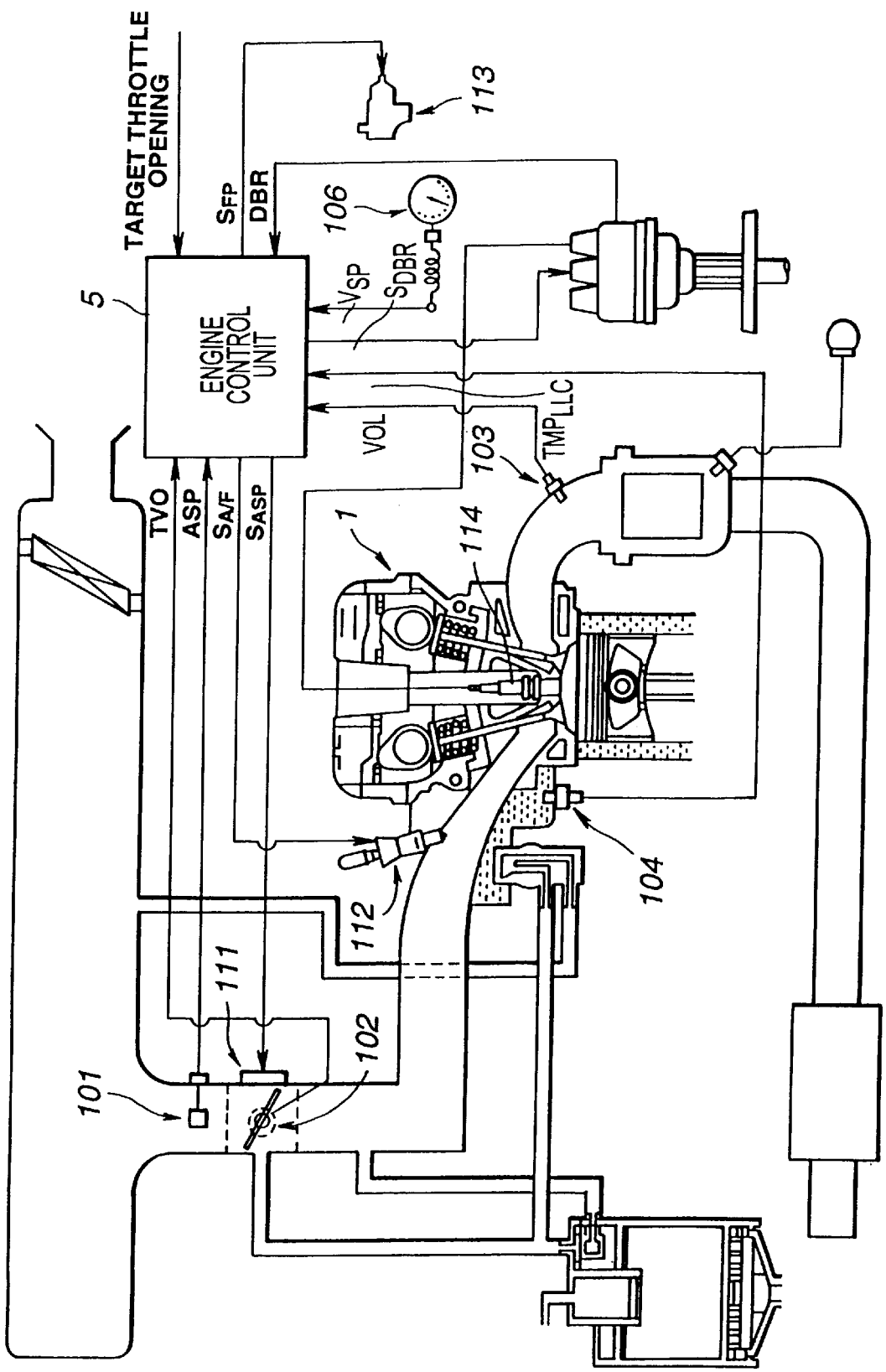
FIG. 2 is an explanatory view of explaining the engine of FIG. 1.

FIG. 2 shows a structure of the engine 1 including the engine control unit 5. The engine 1 is a water-cooled engine of an intake fuel-injection type. The engine 1 is provided with a throttle actuator 111 for controlling a throttle opening of a throttle valve independently of a controlled variable of an acceleration pedal interconnected to the throttle valve. The engine control unit 5 receives an intake air flow rate indicative signal ASP detected by an airflow meter 101, a throttle opening indicative signal TVO detected by a throttle sensor 102, an oxygen quantity VOL in exhaust gases detected by an oxygen sensor ($O_2$ sensor) 103, a coolant temperature $TMP_{LLC}$ detected by a coolant temperature sensor 104, a signal DBR indicative of the rotational condition of the distributor 105, a vehicle speed VSP detected by a vehicle speed sensor 106, an engine rotation speed $N_E$ and an engine rotational phase signal on the basis of a signal of a crank angle sensor (not shown), as a control input.

The engine control unit 5 outputs an intake air flow rate control signal $S_{ASP}$ to the throttle actuator 111, an air-fuel ratio control signal $S_{A/F}$ to each fuel injector 112, a spark timing control signal $S_{DBR}$ to a distributor 105 and a fuel pump control signal $S_{FP}$ to a fuel pump 113. The distributor 105 receives the spark timing control signal $S_{DBR}$ and outputs a spark signal to each spark plug 114. A microcomputer and a peripheral unit thereof constitute the engine control unit 5.

The engine control unit 5 calculates a fuel injection amount corresponding to the intake air flow rate ASP and a spark timing corresponding to the engine load and the engine rotation speed, on the basis of the intake air flow rate ASP and the engine rotation speed and a phase of the engine rotation. Further, the engine control unit 5 outputs an air-fuel ratio control signal $S_{A/F}$ to each fuel injector 112 to achieve the determined fuel injection amount and outputs an ignition timing control signal $S_{DBR}$ to a distributor 105 according to the spark timing. Furthermore, when the engine control unit 5 receives the target throttle opening from the general control unit 8, the engine control unit 5 outputs the intake air flow rate control signal ASP to the throttle actuator 111 to achieve the target throttle opening. If the engine 1 is a diesel engine, the engine output torque is in proportion with the fuel injection amount. Therefore, it is possible to control the engine output torque by controlling the fuel injection amount.

Figure 3:
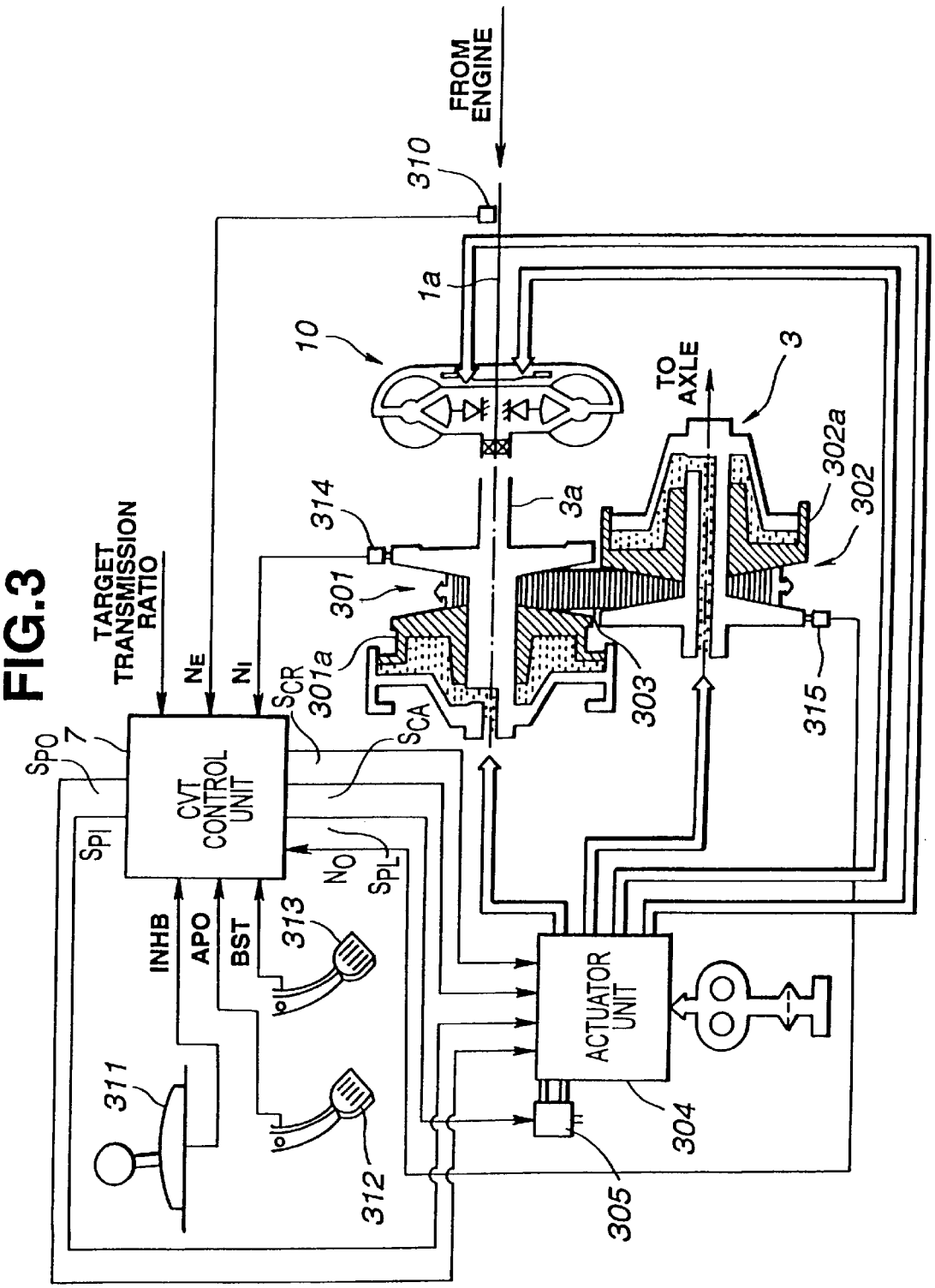
FIG. 3 is an explanatory view of a continuously variable transmission (CVT).

FIG. 3 shows the CVT 3 electrically connected to the CVT control unit 7 and the torque converter 10 coupled to the CVT 3 and the engine 1. As shown in FIG. 3, the CVT 3 is a belt type CVT employing a driver pulley 301, a follower pulley 302 and a belt 303 wound around the driver and follower pulleys 301 and 302. The CVT 3 is arranged to vary the transmission ratio by varying contact radiuses of the pulleys 301 and 302. The contact radiuses are varied by axially moving respective cone members 301a and 302a of the respective pulleys 301 and 302. Each of the cone members 301a and 302a has a top side surface which clumps the belt 303 and a back side surface which slidably defines a hydraulic chamber. The hydraulic chamber partially defined by each cone member 301a, 302a receives a hydraulic pressure for preventing the belt 303 from slipping on the pulleys 301 and 302. A base pressure of this hydraulic pressure is a line pressure which is generated by a pressure control valve in the actuator unit 304 and a line pressure control valve 305. An input shaft 3a of the CVT 3 is integrally connected to the drive pulley 302. The input shaft 3a is connected to an output shaft 1a of the engine 1 through the torque converter 10. The torque converter 10 is of a lockup type having a lockup mechanism. This lockup mechanism employs the hydraulic pressure to establish a lockup state by engaging the lockup clutch and to establish a converter state by releasing the lockup clutch. A torque converter control valve installed in the actuator unit 304 generates this hydraulic pressure employed in this torque converter 10.

The CVT control unit 7 receives a signal INHB indicative of a selected shift position from a select lever, an accelerator opening signal APO indicative of an operation quantity of an acceleration pedal 212, a signal BST indicative of a depression amount of a brake pedal 313, an engine rotation speed signal $N_E$ indicative of the engine rotation speed detected by the engine rotation speed sensor 310, an input shaft rotation speed signal $N_I$ detected by the input rotation speed sensor 314, an output rotation speed signal $N_O$ detected by the output rotation speed sensor 315. Upon receipt of these signals, the CVT control unit 7 outputs a hydraulic pressure control signals $S_{PP}$ and $S_{PS}$ to a hydraulic pressure control valve 304, a line pressure control signal $S_{PL}$ to the line pressure control valve 305, lockup control signals $S_{CA}$ and $S_{CR}$ to the torque converter 10. A microcomputer and peripheral devices thereof constitute the CVT control unit 7.

When the CVT control unit 7 receives the target transmission ratio from the general control unit 8, the CVT control unit 7 controls the hydraulic pressures for controlling the cone members 301a and 302b so as to correspond a transmission ratio, which is obtained from a ratio of the detected inputs shaft rotation speed $N_I$ and the output rotation speed $N_O$, to the target transmission ratio C*. More specifically, the CVT control unit 7 outputs the hydraulic pressure control signal $S_{PP}$ and $S_{PS}$ to the hydraulic pressure control valve 304 to control the hydraulic pressures supplied to the respective chambers for axially moving the cone members 301a and 302a. Generally, the signal detected by the output rotation speed sensor 315 is employed as a vehicle speed indicative signal. Actually, in order to utilize the output rotation speed $N_O$ as a vehicle speed $V_{SP}$, it is necessary to multiply a final reduction gear ratio q to the output rotation speed $N_O$. Therefore, the output rotation speed $N_O$ and the vehicle speed $V_{SP}$ are treated independently, but they have a relationship $N_O=V_{SP} \cdot q$.

Next, with reference to FIG. 4, the brake fluid pressure actuator unit 2 and the brake fluid pressure control unit 6 will be discussed.

The brake fluid pressure actuator unit 2 is disposed between a master cylinder 251 and each of the wheel cylinders 9FL–9RR for the wheels 4FL–4RR. The wheel cylinders 9FL and 9FR of the front two wheels 4FL and 4FR receives a master cylinder pressure $P_{MCF}$ from a first port of the master cylinder 251 to generate a braking force. The wheel cylinders 9RL and 9RR of the rear two wheels 4RL and 4RR receives a master cylinder pressure $P_{MCR}$ form a second port of the master cylinder 251 to generate a braking force. A booster 252 for increasing each master cylinder pressure is installed to the master cylinder 251. A booster pressure $P_{BSTR}$ outputted from the booster 252 is also supplied to each of the wheel cylinders 9FL to 9RR through the braking fluid pressure actuator unit 2. Wheel speed sensors 12FL, 12FR, 12RL and 12RR are installed in the vicinity of the wheels 4FL, 4FR, 4RL and 4RR, respectively and detect respective rotation speeds (wheel speeds) $V_{WFL}$ to $V_{WRR}$ of the wheels 4FL, 4FR, 4RL and 4RR, respectively. The braking fluid pressure control unit 6 receives the wheel speed indicative signals $V_{WFL}$ to $V_{WRR}$ from the wheel speed sensors 12FL to 12RR.

The braking fluid pressure actuator unit 2 is arranged to execute an anti-skid control for preventing sustained wheel-locking on braking and a driving force control or a traction control. As to the construction of the front wheel side, electromagnetic three-position selector valves 254FL and 254FR, in each of which a valve position is controlled according to a current value, are installed between the supply passage of the master cylinder pressure $P_{MCF}$ and the wheel cylinders 2FL and 2FR. P-port of each electromagnetic selector valve 254FL, 254FR is connected to a system of the front wheel master cylinder pressure $P_{MCF}$ of the master cylinder 251 through an orifice 255F, 255FR. R-port of each electromagnetic selector valve 254FL, 254FR is connected to a front-wheel reservoir 256F through an orifice 257FL, 257FR. C-port of each electromagnetic selector valve 254FL, 254FR is connected to the wheel cylinder 2FL, 2FR of each of the front wheels 4FL and 4FR. Further, R-port of each electromagnetic selector valve 254FL, 254FR is connected to a front-wheel pump 262F. The front-wheel pump 262F sucks working fluid from the reservoir 256F and discharges it toward the system of the front-wheel master cylinder pressure $P_{MCF}$ of the master cylinder 251. Check valves 260F and 261F are installed to an inlet side and an outlet side of the front-wheel pump 262F, respectively. A motor 263 drives both of the front-wheel pump 262F and a rear-wheel pump 262R.

Figure 4:
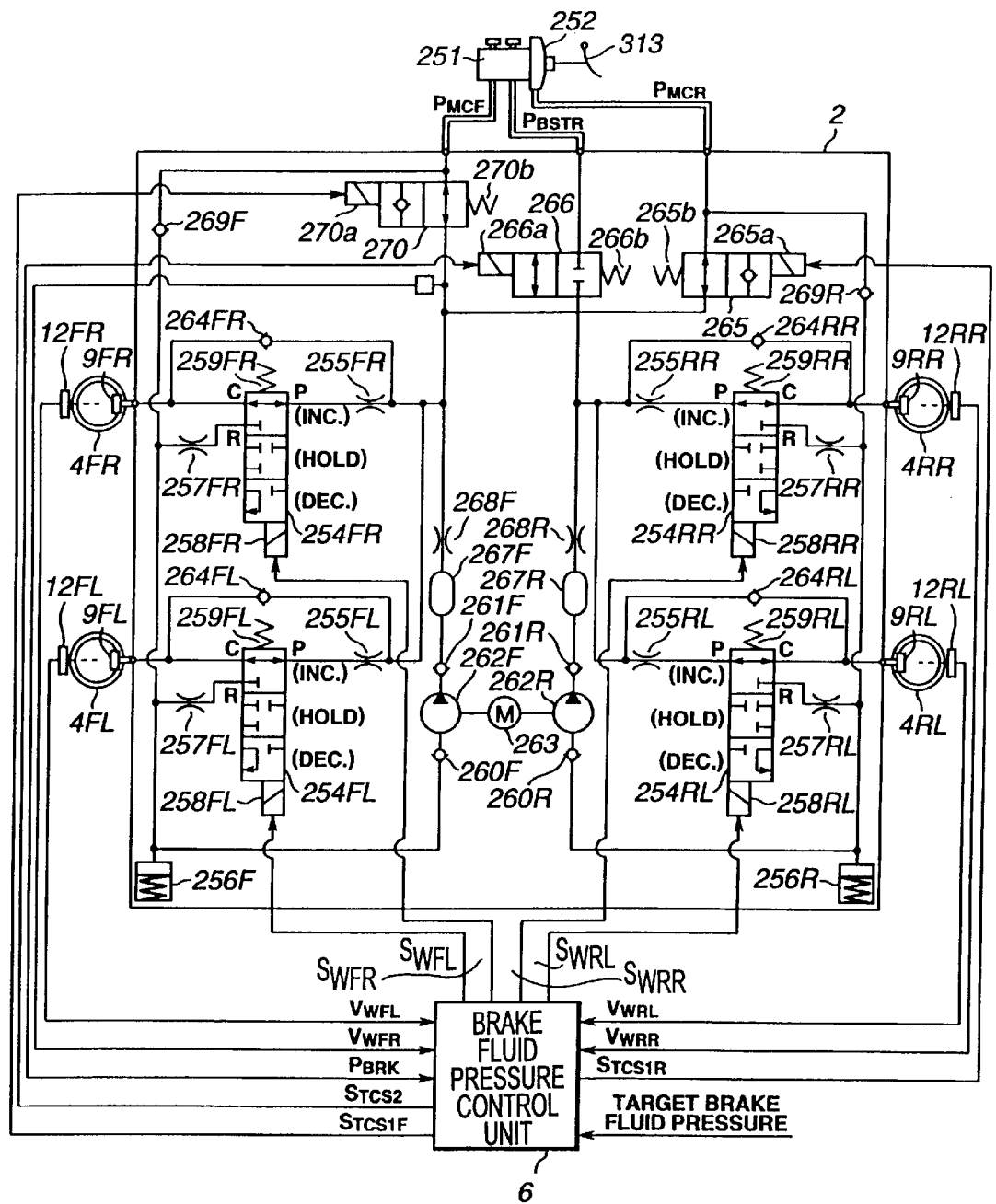
FIG. 4 is an explanatory view of a wheel brake system.

With this arrangement of the braking fluid pressure actuator unit 2, when a solenoid 258FL, 258FR of each electromagnetic three-position solenoid 254FL, 254FR receives a current value of zero, each spool of the three-position selector valve 254FL, 254FR is biased by a return spring 259FL, 259FR at a lowermost position corresponding to an INC. position in FIG. 4. More specifically, the electromagnetic three-position solenoid 254FL, 254FR is set at an increase position wherein the master cylinder pressure $P_{MCF}$ is supplied to each wheel cylinder 2FL, 2FR. When the solenoid 258FL, 258FR receives a small current value of a predetermined value, a hydraulic pressure pushing each spool is balanced with a biasing force of the return spring 259FL, 259FR so as to put the spool at an intermediate position corresponding to a HOLD position in FIG. 4. More specifically, the electromagnetic three-position solenoid 254FL, 254FR is set at a hold position wherein each wheel cylinder 2FL, 2FR is shut off from the master cylinder pressure PMCF to hold the hydraulic pressure therein. Further, when the solenoid 258FL, 258FR receives a large current value of a predetermined large value, each spool is pushed by the hydraulic pressure against the biasing force of the return spring 259FL, 259FR so as to put the spool at an uppermost position corresponding to a DEC. position in FIG. 4. More specifically, the electromagnetic three-position solenoid 254FL, 254FR is set at a decrease position wherein the hydraulic pressure of each wheel cylinder 2FL, 2FR is discharged to the front-wheel reservoir 256F or the master cylinder 251.

Therefore, the pressure control of the wheel cylinder pressures $P_{FL}$ and $P_{FR}$ is executed by switching the control signal to the three-position selector valves 254FL and 254FR of the front wheels 4FL and 4FR. The front-wheel pump 262F is arranged to start rotating simultaneously with the output of the control signal indicative of the decrease position during the anti-skid control or the control signal indicative of the increase position during the driving force control. Thereafter, the front-wheel pump 262F is always rotated if the anti-skid control is being executed. In this embodiment, a commonly known operation is employed in the control of the wheel cylinder pressure during the anti-skid control. Further, it will be understood that a duty ratio control employing a common PWM (Pulse Width Modulation) control method may be employed for the current value control of the electromagnetic three-position selector valves 254FL and 254FR.

Next, actuators for the rear wheels 4RL and 4RR will be discussed briefly. Electromagnetic three-position selector valves 254RL and 254RR connected to the wheel cylinders 2RL and 2RR respectively, a rear-wheel reservoir 256R, a rear-wheel pump 262R have structures as same as those of the front-wheel selector valves 254FL and 254FR, the front-wheel reservoir 2556F and the front-wheel pump 262F. Further, they function as same as the components of the front wheels 4FL and 4FR. Therefore, the corresponding components for the rear wheels 4RL and 4RR are denoted by reference numerals which are obtained by exchanging "F" of the corresponding reference numerals of the components for the front wheels 4FL and 4FR by "R" indicative of a rear wheel.

Further, the brake fluid pressure actuator unit 2 is arranged such that each check valve 264FL, 264FR, 264RL, 264RR is installed in each bypass passage connecting the P-port and the C-port of each of the three-position selector valves 254FL, 254FR, 254RL and 254RR. An electromagnetic two-position selector valve 270 is installed in the supply passage of the front-wheel master cylinder pressure $P_{MCF}$. An electromagnetic two-position selector valve 265 is installed in the supply passage of the rear-wheel master cylinder pressure $P_{MCR}$. The P-ports of the electromagnetic three-position selector valves 254RL and 254RR are connected to the booster 252 through the electromagnetic two-position selector valve 266.

An accumulator 267F and an orifice 268F are connected to the discharge side of the front-wheel pump 262F through the check valve 261F in the order of mention while being connected to the P-ports of the electromagnetic three-position valves 254FL and 254FR. Similarly, an accumulator 267R and an orifice 268R are connected to the discharge side of the rear-wheel pump 262R through the check valve 261R in order of mention while being connected to the P-ports of the electromagnetic three-position valves 254RL and 254RR. The front-wheel reservoir 256F and the R-ports of the electromagnetic three-position valves 254FL and 254FR are connected to the line of the master cylinder pressure $P_{MCF}$ through a check valve 269F. Similarly, the rear-wheel reservoir 256R and the R-ports of the electromagnetic three-position valves 254RL and 254RR are connected to the line of the master cylinder pressure $P_{MCR}$ through a check valve 269R. When the control current value to the solenoid 270a is zero, the electromagnetic selector valves 270 are set to supply the master cylinder pressure $P_{MCF}$ to the P-ports of the three-position selector valves 254FL and 254FR due to the return spring 270b. Similarly, when the control current value to the solenoid 265a is zero, the electromagnetic selector valves 265 are set to supply the master cylinder pressure $P_{MCR}$ to the P-ports of the three-position selector valves 254RL and 254RR due to the return spring 265b. Further, when the control current value taking a predetermined value is applied to the solenoid 270a, the electromagnetic selector valves 270 are set to return the excessively high base pressure to the P-ports of the three-position selector valves 254FL and 254FR due to the return spring 270b (normal position). When the control current value taking a predetermined value is applied to the solenoid 265a, the electromagnetic selector valves 265 are set to return the excessively high base pressure to the P-ports of the three-position selector valves 254RL and 254RR due to the return spring 265 (selector position). When the control current value to the solenoid 266a is zero, the booster selector valve 266 is set to shut out the booster pressure $P_{BSTR}$ of the booster 252 from the three-position selector valves 254FL to 254RR due to the function of the return spring 266b (normal position). Further, when the control current value taking a predetermined value is applied to the solenoid 266a, the booster pressure $P_{BSTR}$ is supplied to the P-ports of the three-position selector valves 254FL to 254RR (selector position).

Accordingly, by driving the front-wheel pump 262F, the rear-wheel pump 262R and the electromagnetic three-position selector valves 254FL to 254RR under a condition that both of the selector valves 270 and 265 and the booster selector valve 266 are put in the normal position, it becomes possible to execute the pressure control during the anti-skid control. On the other hand, by setting the master cylinder selector valves 270 and 265 at the selector position under the condition that the front-wheel and rear-wheel pumps 262F and 262R are driven, the discharge pressures from the front-wheel and rear-wheel pumps 262F and 262R are stored at the accumulators 267F and 267R respectively, and the master cylinder pressures $P_{MCF}$ and $P_{MCR}$ are increased even if the acceleration pedal 312 is not depressed. If each of the master cylinder pressures $P_{MCF}$ and $P_{MCR}$ is once increased, by the virtue of a check valve function of the master cylinder selector valve 270, 265 put in the selector position, the increased master cylinder pressure $P_{MCF}$, $P_{MCR}$ is maintained. Further, the master cylinder pressures $P_{MCF}$ and $P_{MCR}$ pressurize the booster pressure $P_{BSTR}$ outputted from the booster 252. Therefore, if the position of the booster selector valve 266 is set at the selector position under this condition, the booster pressure $P_{BTR}$ maintained at high pressure is supplied to the P-ports of the three-position selector valves 254FL to 254RR. Accordingly, if under this condition the three-position selector valves 254FL to 254RR are controlled as mentioned above, it is possible to generate and control the wheel braking force of the rear wheels even if the brake pedal 313 is not depressed. Further, this enables the execution of the driving force control. More particularly, this enable the control of slipping of the drive wheels 4FL and 4FR which are receiving excessive drive force.

The selector valves 270 and 265 for the master cylinder 251 execute selecting operations according to control signals $S_{TCS1F}$ and $S_{TCS1R}$ outputted from the brake fluid pressure control unit 6. The booster selector valve 266 executes its selecting operation according to control signals STCS2. The three-position selector valves 254FL to 254RR execute selecting operations according to control signals $S_{WFL}$ to $S_{WRR}$.

The brake fluid pressure control unit 6 comprises a microcomputer which executes processing for the anti-skid control and the driving force control based on at least the wheel speeds $V_{WFL}$ to $V_{WRR}$, a brake switch signal, a steer angle and the master cylinder pressures $P_{MCF}$ and $P_{MCR}$. The microcomputer of the brake fluid pressure control unit 6 calculates target wheel-cylinder pressure variations $\Delta P^*_{FL}$, $\Delta P^*_{FR}$, $\Delta P^*_{RL}$ and $\Delta P^*_{RR}$ with respect to the target wheel speed $V_W^*$ by means of the PD (Proportion-differential) control method. Further, the microcomputer of the brake fluid pressure control unit 6 outputs control signals $S_{WFL}$, $S_{WFR}$, $S_{WRL}$ and $S_{WRR}$ to the three-position selector valves 254FL, 254FR, 254RL and 254RR respectively so as to achieve the target wheel cylinder variations $\Delta P^*_{FL}$, $\Delta P^*_{FR}$, $\Delta P^*_{RL}$ and $\Delta P^*_{RR}$.

When the driving force control is executed, a boost pressure mode (selector position) is selected to operate the booster 252 so as to supply the booster pressure PBSTR to the P-ports of the three-position selector valves 254FL–254RR. When the driving force control is not executed, a normal pressure mode (normal position) is selected, and one of a radical increasing mode, a holding mode an a slow decreasing mode is selected on the basis of the wheel speed $V_{WFL}$, $V_{WFR}$, $V_{WRL}$, $V_{WRR}$ with respect to a threshold and a wheel acceleration and deceleration $V'_{WFL}$, $V'_{WFR}$, $V'_{WRL}$, $V'_{WRR}$. The brake fluid pressure control unit 6 outputs the control signals $S_{RCS1F}$, $S_{TCS1R}$ and $S_{TCS2}$ to the selector valves 270, 265 and 266, respectively and the control signals $S_{WFL}$, $S_{WFR}$, $S_{WRL}$ and $S_{WRR}$ to the three-position selector valves 254FL, 254FR, 254RL and 254RR respectively. When the anti-skid control and the driving force control are not executed and when the general control unit 8 outputs the target total braking force, the base pressure of the braking fluid pressure to the wheel cylinders 9RL, 9FR, 9RL and 9RR are monitored by a pressure sensor 271, and the base pressure is feedback controlled as the braking fluid pressure $P_{BRK}$ with respect to the target value.

Figure 5:
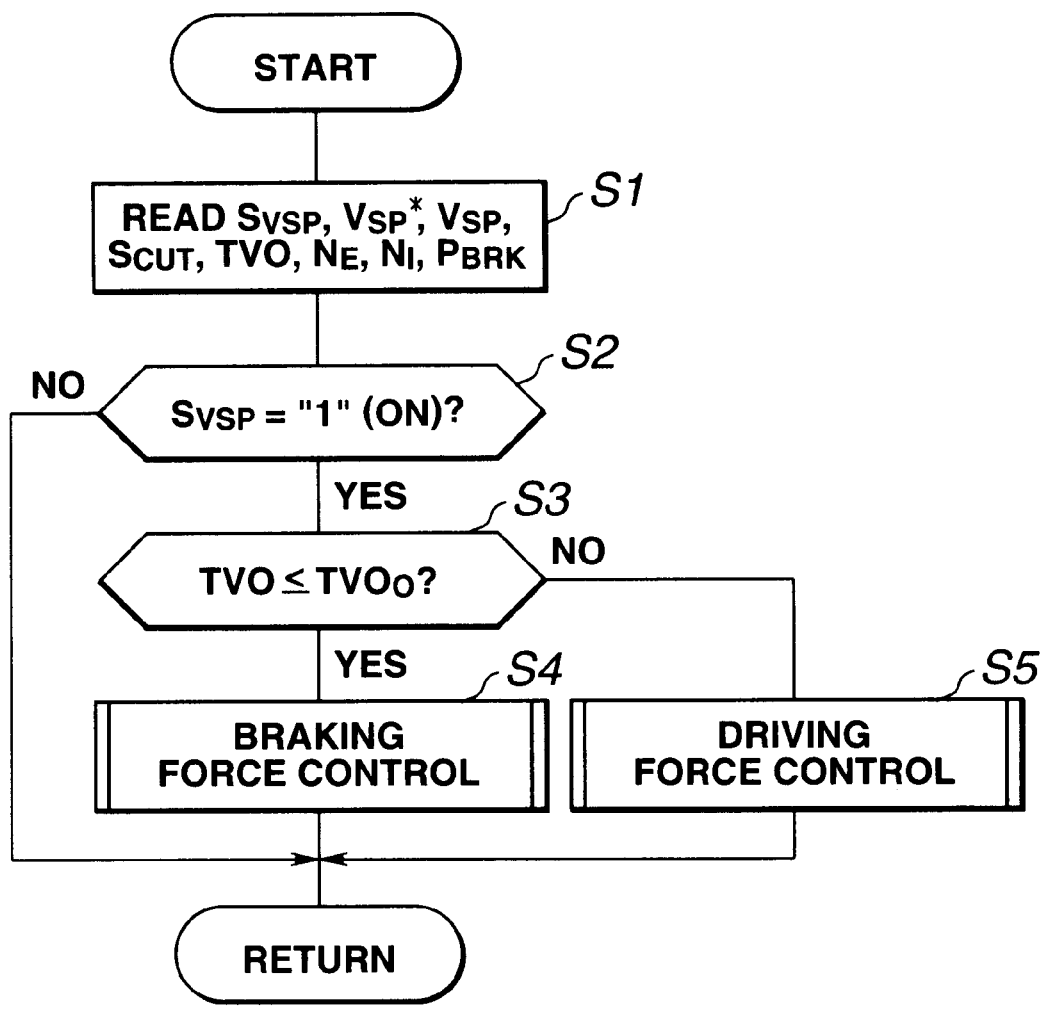
FIG. 5 is a flowchart showing a general flow executed by a general control unit.

The general control unit 8 comprises a microcomputer and a peripheral unit thereof. The general control unit 8 is arranged to execute controls on the basis of the programs shown in FIGS. 5 and 6. FIG. 5 shows an operation program executed by the general control unit 8. This operation is executed by timer interruption at predetermined sampling time intervals $\Delta T$. In this embodiment, the sampling time interval $\Delta T$ is set at 10 msec. The general control unit 8 properly reads programs, maps and tables employed in various operations from a storage device of a peripheral unit of the general control unit 8. Further, some operation results of the general control unit 8 are updated and stored in the storage device. The general control unit 8 is connected to the engine control unit 5, the brake fluid pressure control unit 6 and the CVT control unit 7 to input and output information thereamong. More particularly, the CVT control unit 7 receives a target transmission ratio C* from the general control unit 8. The engine control unit receives a target throttle opening TVO* from the general control unit 8. The brake fluid pressure control unit 6 receives a target brake fluid pressure $P_{BRK}^*$ from the general control unit 8.

At a step S1 in the flowchart of FIG. 5, the general control unit 8 reads a target vehicle-speed follow-up control switch signal $S_{VSP}^*$ and a target vehicle speed $V_{SP}^*$ from the target vehicle speed setting apparatus 11. The target vehicle-speed follow-up control switch signal $S_{VSP}^*$ is generated by a manual switching operation of a driver of the vehicle. Further, the general control unit 8 reads the vehicle speed $V_{SP}$ from the vehicle speed sensor 106, a fuel-cut signal $S_{CUT}$ from the engine control unit 5, the throttle opening TVO from the throttle sensor 102, the engine rotation speed $N_E$ from the engine rotation speed sensor 310, the CVT input rotation speed $N_I$ from the input rotation speed sensor 314 and the brake fluid pressure $P_{BRK}$ from the pressure sensor 271.

At a step S2, the general control unit 8 decides whether the target vehicle-speed follow-up control switch signal $S_{VSP}$ takes a logical value "1" indicative of a turn-on condition of a target vehicle-speed follow-up control switch. When the decision at the step S2 is affirmative, the routine proceeds to a step S3. When the decision at the step S2 is negative, the routine returns to a start step of this main program.

At the step S3, the general control unit 8 decides whether the throttle opening TVO is smaller than or equal to a predetermined value $TVO_0$. When the decision at the step S3 is affirmative, the routine proceeds to a step S4. When the decision at the step S3 is negative, the routine proceeds to a step S5. The predetermined value $TVO_0$ is set by one of a driver of the vehicle and an automatic procedure according to the vehicle running condition. If the predetermined value $TVO_0$ is not determined by neither of them, it is set at a full close state or full open state.

Figure 6:
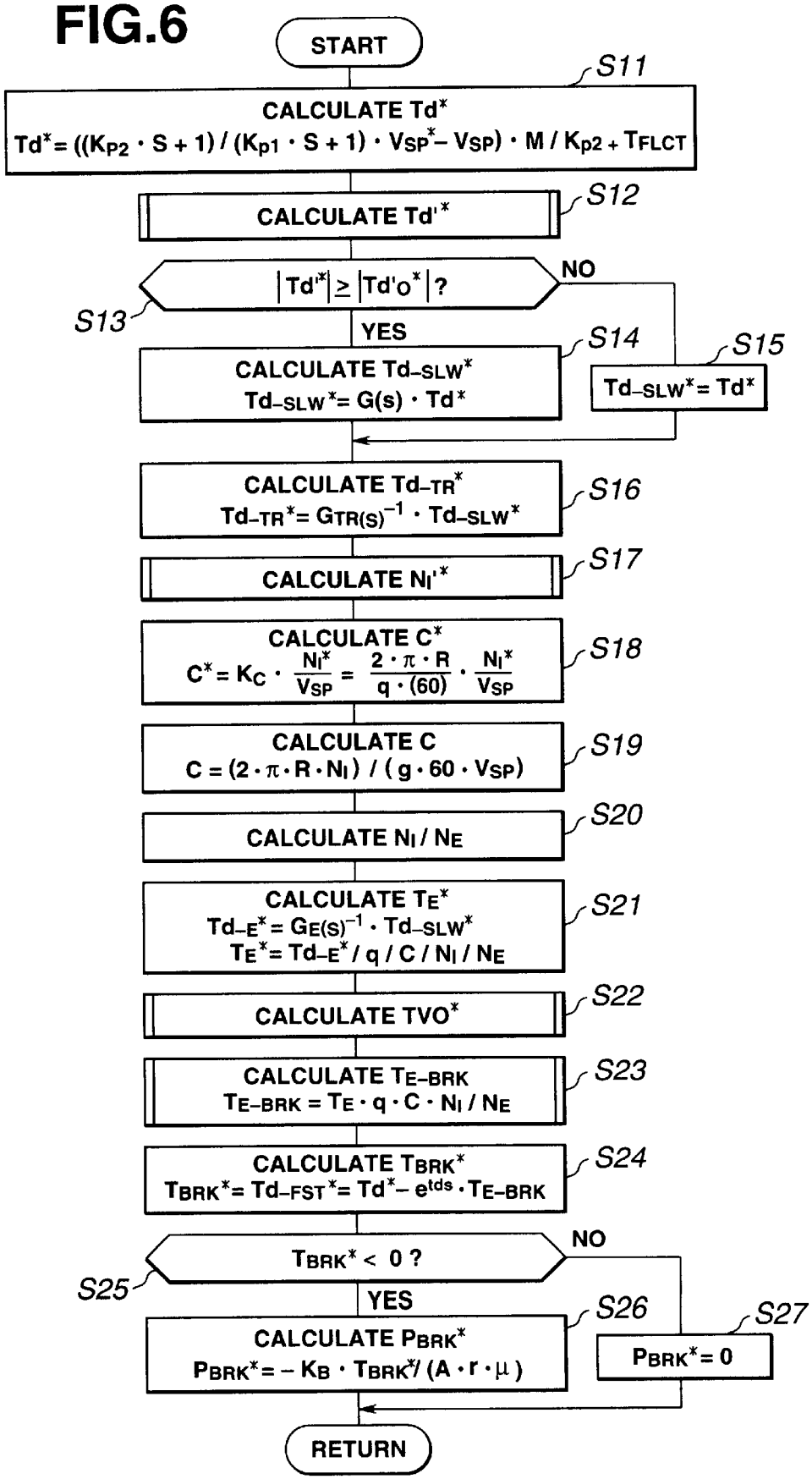
FIG. 6 is a flowchart showing a miner flow of the flowchart of FIG. 5.

At the step S4, the routine of the main program of the general control unit 8 jumps to a miner program shown by a flowchart of FIG. 6 to execute the braking force control. After the execution of the miner program for the braking force control, the routine returns to the main program.

At the step S5, the routine of the main program of the general control unit 8 jumps to a miner program which executes the driving force control. After the execution of the miner program for the driving force control, the routine returns to the main program. The driving force control is executed by the following manner. First, a driving force for following up the target vehicle speed $V_{SP}^*$. The target transmission ratio and the target engine output are decided so as to achieve the target vehicle speed $V_{SP}^*$ thereby. The target transmission ratio and the target engine output are sent to the CVT control unit 7 and the engine control unit 5.

With reference to the flowchart of FIG. 6, the miner program for the braking force control executed at the step S4 will be discussed.

At the step S11 of FIG. 6, the general control unit 8 calculates a target total braking force Td* from the following equation (1).

$$Td^* = ((K_{p2} \cdot S + 1)/(K_{p1} \cdot S + 1) \cdot V_{SP}^* - V_{SP}) \cdot M/K_{p2} + T_{FLCT} \quad (1)$$

wherein $K_{P1}$ is a norm model time constant, $K_{P2}$ is a time constant of a feedback compensator, M is a vehicle weight, and $T_{FLCT}$ is a driving resistance including rolling resistance, air resistance and grade resistance. The running resistance is calculated by an estimated equation. When the target total braking force Td* takes a positive value, it functions as a target driving force. When the target total braking force Td* takes a negative value, it functions as a target total braking force. In the equation (1), the braking force is also represented by a negative value.

At a step S12, the general control unit 8 calculates a change rate Td'* which is a rate of change of the target total braking force Td*. More specifically, the change rate Td'* is obtained by dividing a difference between a previous-time target total braking force and a present-time target total braking force by the predetermined sampling time ΔT. Further, a time differential of the target total braking force Td*, which is obtained by applying a bypass filter treatment having a predetermined phase advance characteristic to the target braking force Td*, may be employed as the change rate Td'*.

At a step S13, the general control unit 8 decides whether the absolute value |Td'*| of the change rate Td'* is greater than or equal to a predetermined value $|Td'^*_0|$. When the decision at the step S13 is affirmative, the routine proceeds to a step S14. When the decision at the step S13 is negative, the routine proceeds to a step S15. The predetermined value $|Td'^*_0|$ corresponds to an upper limit value of the follow-up response speed of the actual transmission ratio which speed is achieved with respect to the target transmission ratio by the CVT. Further, the predetermined value $|Td'^*_0|$ may be an upper limit value of the follow-up response speed of the actual engine output which speed is achieved with respect to the target engine output by the engine or an upper limit value of the follow-up response speed of the actual engine braking force which is actually generated by the power unit with respect to the target engine braking force. More specifically, it may be an upper limit of the response speed of the engine braking force which achieves the target total braking force by means of the power unit.

At a step S14, the general control unit 8 calculates a slow component $Td_{-SLW}^*$ of the target total braking force Td* from the following equation (2).

$$Td_{-SLW}^* = G(s) \cdot Td^* \quad (2)$$

$$G(s) = 1/(1+Ts) \quad (2\text{-}1)$$

wherein T is a time constant of a low pass filter, and G(s) is the Laplace transform transfer function. The slow component is a component of the target total braking force, and performs a slow change rate of the target total braking force.

In this embodiment, the component $Td_{-SLW}^*$, which is a slow part of the target total braking force Td*, is taken as a low frequency component and is extracted by the low pass filter. The time constant T of the low pass filter is set according to the follow-up response speed of the engine braking force because the slow component $Td_{-SLW}^*$ of the target total braking force is a target total braking force component achieved by the engine braking force. The follow-up response speed of the actual transmission ratio achievable by the CVT 3 with respect to the target transmission ratio or the follow-up response speed of the actual engine output achievable by the engine 1 with respect to the target engine output may be employed instead of the follow-up response speed of the engine braking force.

On the other hand, at the step S15, the general control unit 8 employs the target total braking force Td* as the slow component $Td_{-SLW}^*$ of the target total braking force Td*.

At a step S16, the general control unit 8 calculates an output target force $Td_{-TR}^*$ by using the slow component $TD_{-SLW}^*$ and the following equation (3).

$$Td_{-TR}^* = G_{TR}(s)^{-1} \cdot Td_{-SLW}^* \quad (3)$$

where $G_{TR}(S)^{-1}$ is an inverse response function to the transmission ratio.

Figure 7:
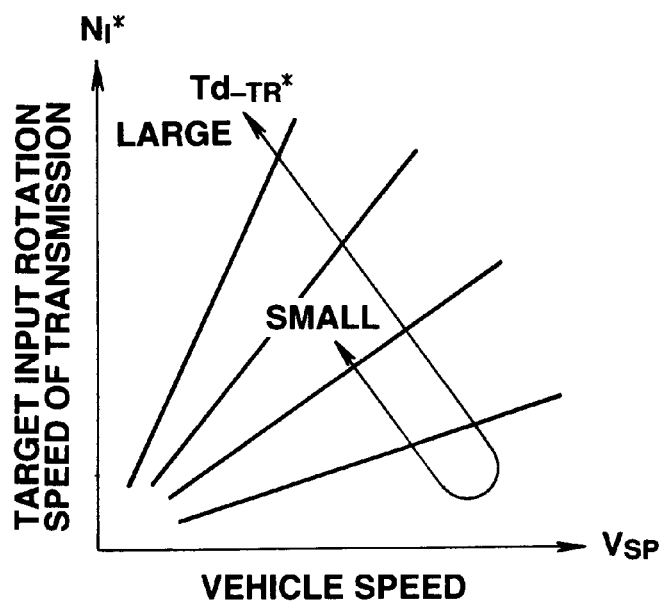
FIG. 7 is a control map for setting a transmission target input rotation speed, employed in the processing of FIG. 6.

At a step S17, the general control unit 8 calculates a transmission target input rotation speed $N_I^*$ from the output target force $Td_{-TR}^*$ and a control map shown in FIG. 7. The control map shown in FIG. 7 shows a relationship of the transmission target input rotation speed $N_I^*$ with respect to the vehicle speed $V_{SP}$ while employing the output target force $Td_{-TR}^*$ as a parameter. As is apparent from the graph of FIG. 7, if the vehicle speed $V_{SP}$ increases, the transmission target input rotation speed $N_I^*$ also increases. Further, if the output target braking force $Td_{-TR}^*$ of the CVT 3 is large in a positive value range, the transmission target input rotation speed $N_I^*$ also is large. If the output target force $Td_{-TR}^*$ of the CVT 3 is small in the positive value range, the transmission target input rotation speed $N_I^*$ temporally takes a small value. But, thereafter if the output target force $Td_{-TR}^*$ of the transmission 3 is put in a negative value range and if the absolute value thereof becomes large, the transmission target input rotation speed $N_I^*$ becomes large.

At a step S18, the general control unit 8 calculates a target transmission ratio C* from the following equation (4).

$$C* = K_C \cdot (N_I * / V_{SP}) \quad (4)$$
$$= (2\pi R)/(q \cdot (60)) \cdot (N_I * / V_{SP})$$

where R is a tire rolling dynamic radius, q is a final reduction speed ratio, and (60) is a conversion factor in case that the unit of the target input rotation speed $N_I^*$ is (rpm) and the unit of the vehicle speed VSP is (m/S).

At a step S19, the general control unit 8 calculates an actual transmission ratio C from the following equation (5).

$$C = (2\pi R \cdot N_I)/(q \cdot (60) \cdot V_{SP}) \quad (5)$$

At a step S20, the general control unit 8 calculates a ratio $N_I/N_E$ of the input rotation speed and the output rotation speed of the torque converter 10.

At a step S21, the general control unit 8 calculates a target engine output $T_E^*$ from the slow component $Td_{-SLW}^*$ and the following equations (6) and (7).

$$Td_{-E}^* = G_E(s)^{-1} \cdot Td_{-SLW}^* \quad (6)$$
$$T_E = Td_{-E}^* / q / C / N_I / N_E \quad (7)$$

where $G_E(s)^{-1}$ is an engine output inverse response function, $Td_{-E}^*$ is a target engine torque, and if it takes a negative value, it represents the target engine braking force.

Figure 8:
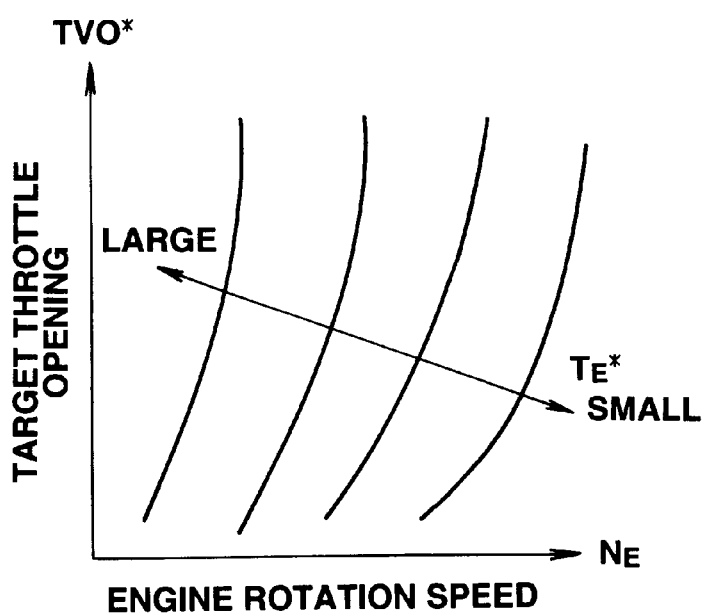
FIG. 8 is a control map for setting a target throttle opening, employed in the processing of FIG. 6.

At a step S22, the general control unit 8 calculates a target throttle opening TVO* from the target engine output $T_E^*$ and a control map shown in FIG. 8. The control map of FIG. 8 represents a relationship of the target throttle opening TVO* with respect to the engine rotation speed $N_E$ while employing the target engine output $T_E^*$ as a parameter. As is apparent from the control map of FIG. 8, if the engine rotation speed $N_E$ takes a large value, the target throttle opening TVO* also takes a large value. Further, if the target engine output $T_E^*$ takes a large value, the target throttle opening TVO* also takes a large value. Inversely, if the target engine output $T_E^*$ takes a negative value to operate an engine braking force, the engine rotation speed $N_E$ becomes large and the target throttle opening TVO* becomes small. But, if a lower limit value $TVO_{MIN}$ is set for the throttle opening TVO, the target throttle opening TVO* is restricted by the lower limit value $TVO_{MIN}$.

Figure 9:
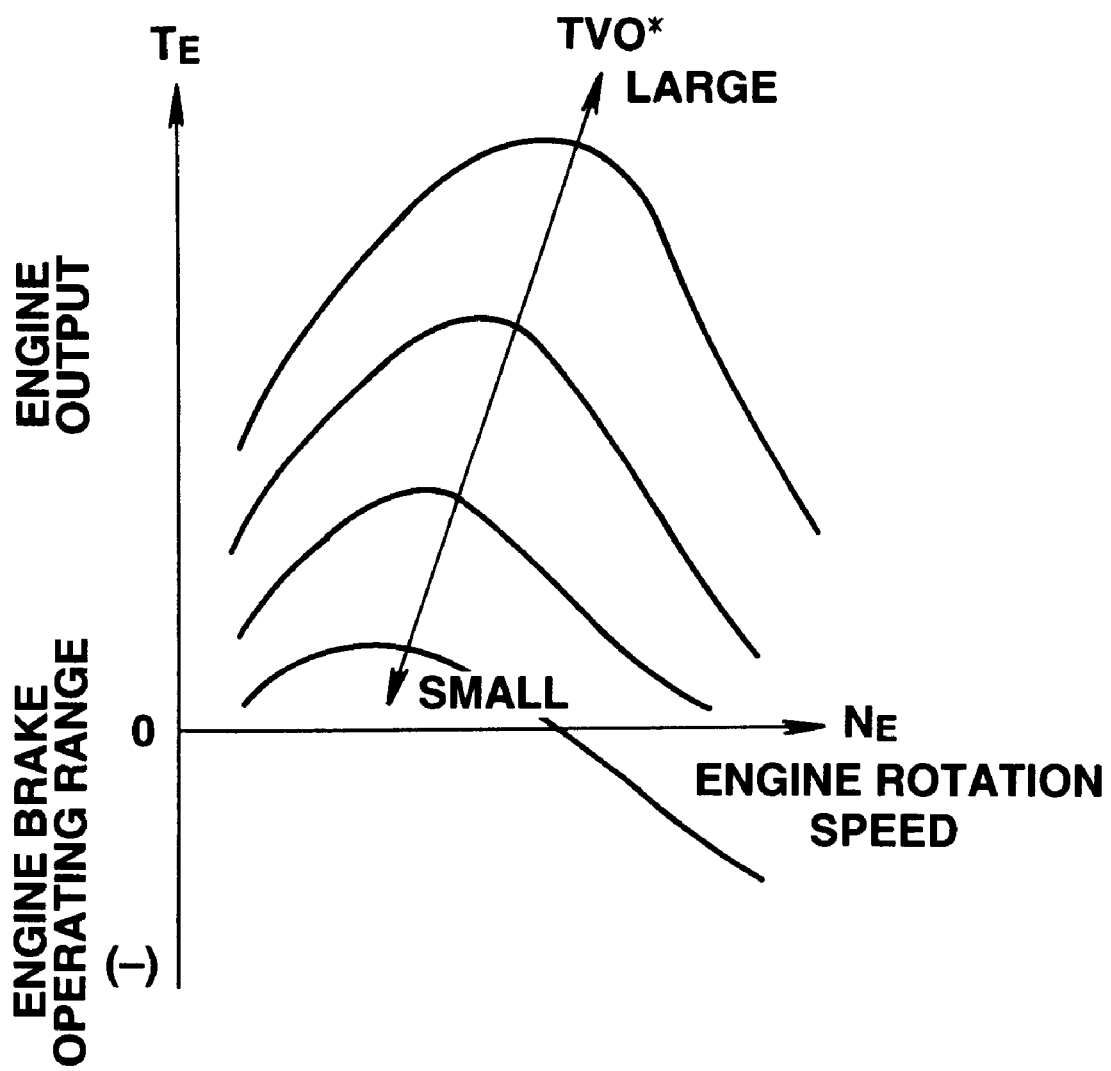
FIG. 9 is a control map for setting an engine output, employed in the processing of FIG. 6.

At a step S23, the general control unit 8 calculates an engine brake force $T_{E-BRK}$ by obtaining an outputable engine output $T_E$ from a control map of FIG. 9 and using the obtained outputable engine output $T_E$ and the following equation (8).

$$T_{E-BRK} = T_E \cdot q \cdot C \cdot N_I / N_E \quad (8)$$

The control map of FIG. 9 represents a relationship of the engine out put $T_E$ with respect to the engine rotation speed $N_E$ while employing the target throttle opening TVO* as a parameter. As is apparent from the control map of FIG. 9, if the engine rotation speed $N_E$ increases, the engine output $T_E$ temporally increases and then decreases. Further, if the target throttle opening TVO* takes a large value, the engine output $T_E$ also takes a large value. If the target throttle opening TVO* is small and if the engine rotation speed NE is large, the engine output $T_E$ takes a negative value and functions as an engine braking force. The control map of FIG. 9 is changed according to whether or not a fuel-cut operation is employed.

At a step S24, the general control unit 8 calculates a fast component $Td_{-FST}^*$ of the target total braking force Td* as a target wheel braking force $T_{BRK}^*$ from the engine braking force $T_{E-BRK}$ and the following equation (9).

$$T_{BRK}^* = Td_{-FST}^* = Td^* - e^{tds} \cdot T_{E-BRK} \quad (9)$$

where td is a response dead time of the engine braking force $T_{E-BRK}$, and $e^{tds}$ is the Laplace transform expression of the response dead time td. The fast component is a component of the target total braking force, and performs a fast change rate of the target total braking force. When the target wheel braking force $T_{BRK}^*$ is a negative value, it means that the actual wheel braking force is required.

At a step S25, the general control unit 8 decides whether the target wheel braking force $T_{BRK}^*$ is a negative value or not. When the decision at the step S25 is affirmative, the routine proceeds to a step S26. When the decision at the step S25 is negative, the routine proceeds to a step S27.

At the step S26, the general control unit 8 calculates a target brake fluid pressure $P_{BRK}^*$ for generating the target wheel brake force $T_{BRK}^*$ from the following equation (10) and returns then to the main program of FIG. 5.

$$T_{BRK}^* = K_B \cdot T_{BRK}^* = -T_{E-BRK}^* / (A \cdot R \cdot \mu) \quad (10)$$

where A is a total area of the cylinder wheel, r is a rotor effective radius, and $\mu$ is a pad friction coefficient.

At the step S27, the general control unit 8 resets the target brake fluid pressure $P_{BRK}^*$ at zero ($P_{BRK}^* = 0$) and returns to the main program of FIG. 5.

The control operation of the braking force control system ensured by the above mentioned processing of the embodiment according to the present invention would be discussed hereinafter with reference to timing charts of FIGS. 10A–10E and 11A–11E.

Figure 10A:
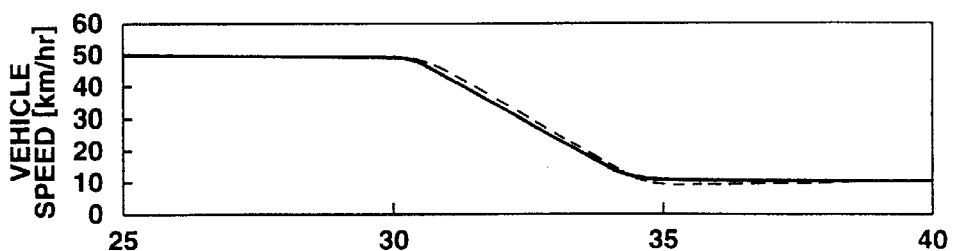
FIGS. 10A to 10E are timing charts showing operations achieved by the processing of the flowcharts of FIGS. 6 and 7.
Figure 10B:
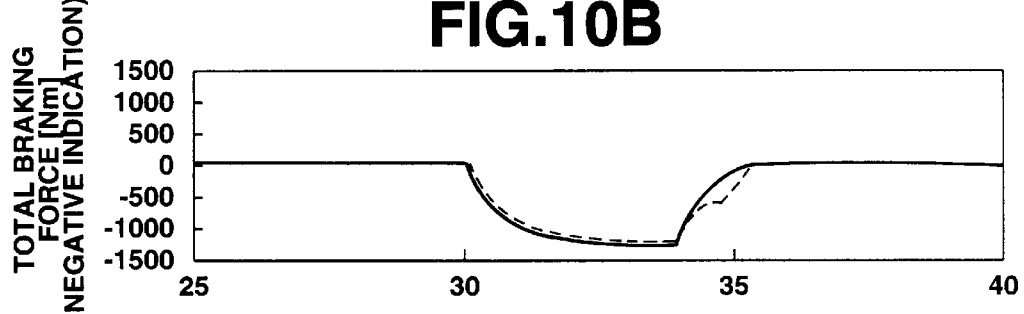
Figure 10C:
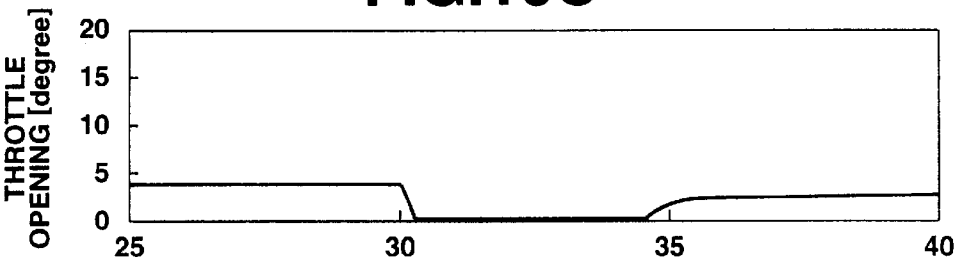
Figure 10D:
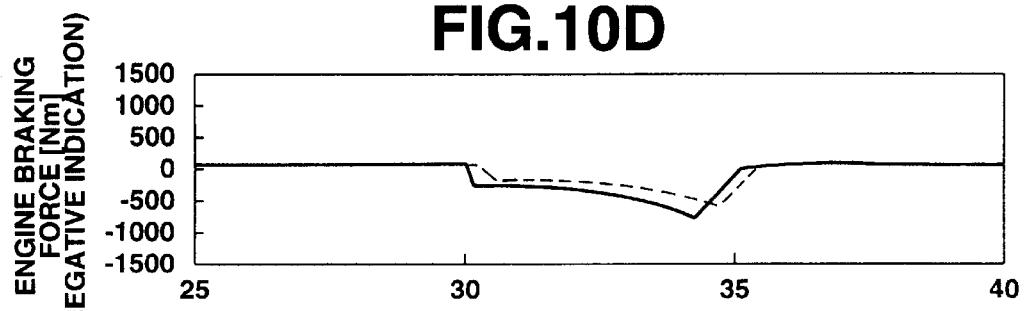
Figure 10E:
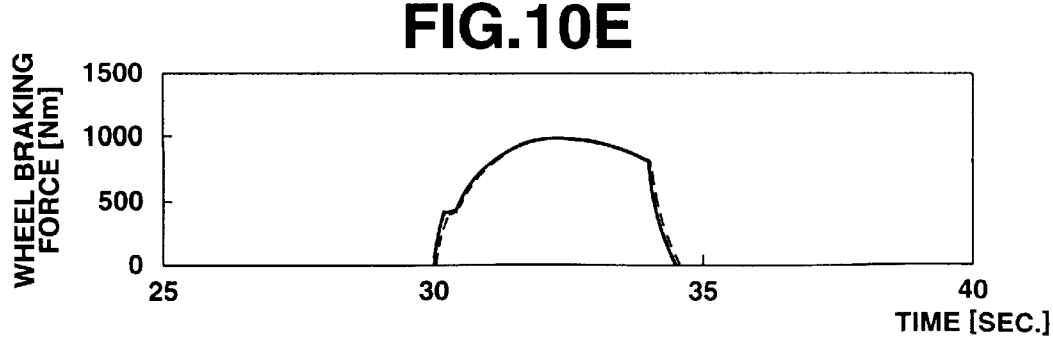
Figure 11A:
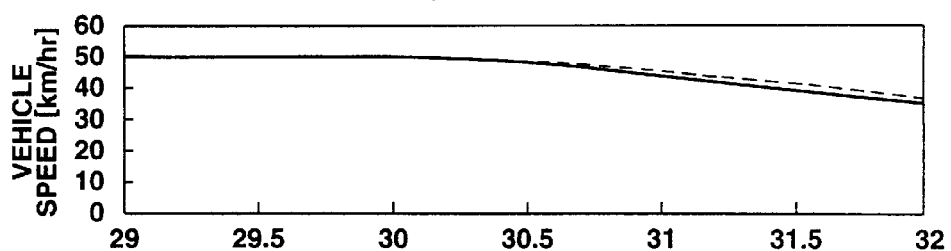
FIGS. 11A to 11E are partially enlarged timing charts of FIGS. 10A to 10E.
Figure 11B:
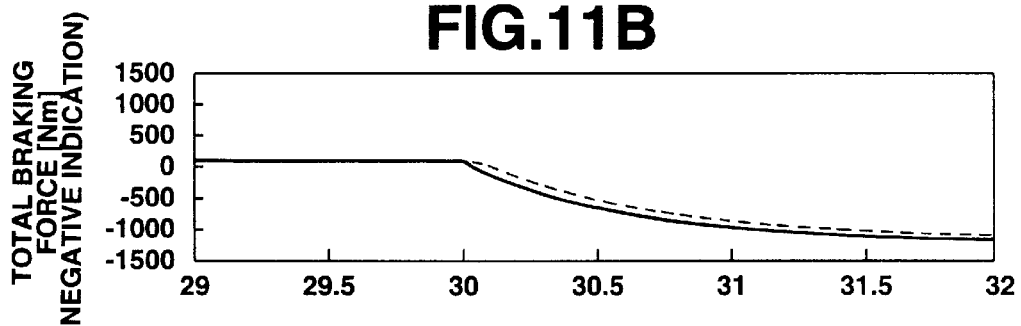
Figure 11C:
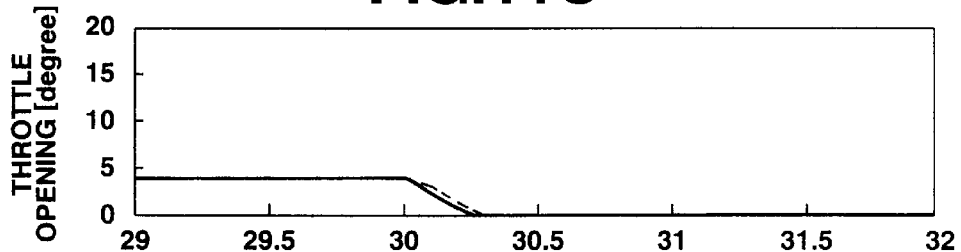
Figure 11D:
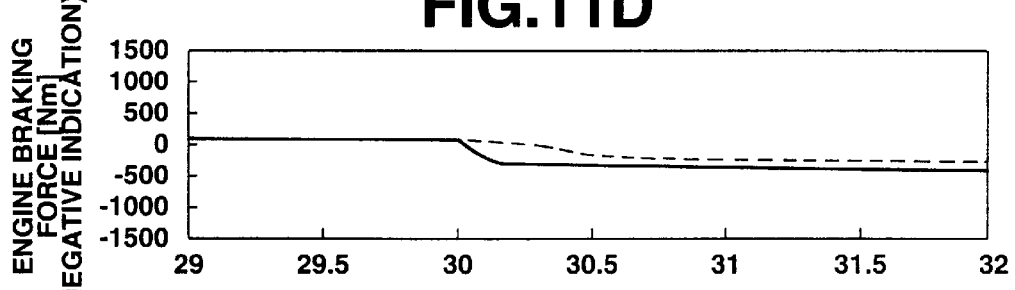

The time charts of FIGS. 10A–10E represent a simulation result of the target total braking force follow-up control where the vehicle speed is decelerated from 50 km/h to 10 km/h during 5 seconds from the time 30 second to the time 35 second. The time charts of FIGS. 11A–11E show partial views of FIGS. 10A–10E, and more particularly a period from the time 29 second to the time 32 second. The time charts of FIG. 10A and FIG. 11A show a change of the vehicle speed with respect to a time lapse. The time charts of FIGS. 10B and 11B show a change of the total braking force (represented by negative value) with respect to a time lapse. The time charts of FIGS. 10C and 11C show a change of the throttle opening with respect to a time lapse. The time charts of FIGS. 10D and 11D show a change of the engine braking force with respect to a time lapse. The time charts of FIGS. 10E and 11E a change of the wheel braking force with respect to a time lapse. In all charts, real lines denote target values, and dotted lines denote actual values.

In the above-mentioned simulation, the following conditions are previously determined. A predetermined value $TVO_0$ of the throttle opening for starting the braking force control was set at 80 degrees. That is, it is set to be able to start the braking force control in almost all cases if the braking force is required. Further, the lower limit $TVO_{MIN}$ of the target throttle opening is set at zero. The rate of change of the vehicle speed $V_{SP}$ for decreasing the target vehicle speed $V_{SP}^*$ from 50 km/h to 10 km/h is limited by a limiter.

In this simulation, since the target total braking force Td* is set by means of the model matching method executed at the step S11 of the flowchart of FIG. 6, the target total braking force Td* radically increases its absolute value in the negative value range after the time 30 second. The target total braking force Td* finally stabilizes according to the decrease of a difference $\Delta V_{SP}^*$ between the target vehicle speed $V_{SP}$ (10 km/h) and the vehicle speed $V_{SP}$ owing to the engine braking force and the wheel braking force. Since each gain $K_{P1}$, $K_{P2}$ is varied according to the magnitude of the difference $\Delta V_{SP}^*$, the target total braking force Td* takes a negative value having a small absolute value before the time 35 second when the vehicle speed $V_{SP}$ corresponds to the target vehicle speed $V_{SP}^*$. That is, the total braking force starts to decrease and gradually approaches zero from the time 35 seconds.

At the step S14 of the flowchart of FIG. 6, the absolute value |Td'*| of the change rate promptly becomes greater than the predetermined value |Td'*$_0$| after the time 30 second with respect to the target total braking force Td*. The routine, therefore, proceeded from the step S13 to the step S14 wherein the slow component Td$_{-SLW}$* of the target total braking force is extracted by the low-pass filter treatment. At the steps S16 to S18, the transmission target input rotation speed $N_I^*$ and the target transmission ratio C* are calculated from the transmission output target force Td$_{-TR}$* according to the slow component Td$_{-SLW}$*. Further, at the steps S19 to S21, the target engine torque Td$_{-E}$* and the target engine output $T_E^*$ are calculated. During this operation, the target total braking force Td* takes a negative value having a large absolute value promptly after the time 30 second. Therefore, the target engine torque Td$_{-E}$* and the target engine output Td$_E$* take negative values having large absolute values. Then, at the step S22 of the flowchart of FIG. 6, the calculated value TVO$_{-ORG}$* of the target throttle opening takes the negative value so as to satisfy the target throttle opening $T_E^*$ set at the negative value having a large absolute value. Since the lower limit TVO$_{MIN}$ of the target throttle opening is set at zero, the target throttle opening TVO* is limited at zero and the actual throttle opening TVO is promptly varied to zero due to its high responsibility. The target engine braking force of each of FIGS. 10D and 11D is denoted by a continuous line and corresponds to the target engine torque (brake force) $T_E^*$. In this simulation result, the response dead time of the engine braking force is not substantially considered.

Figure 11E:
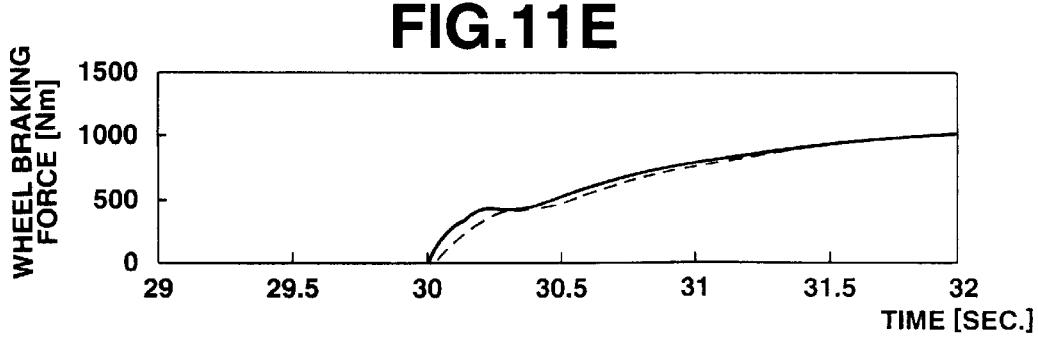
Figure 12A:
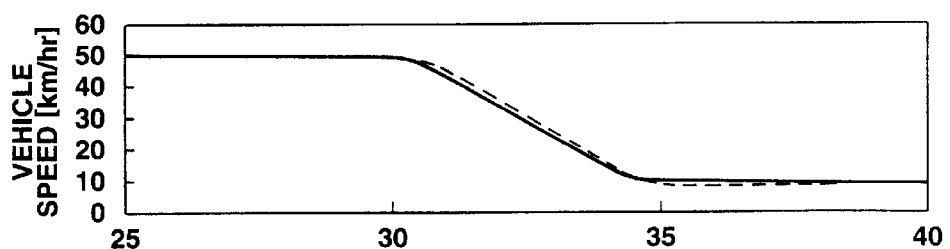
FIGS. 12A to 12E are timing charts of operations achieved by a conventional apparatus.
Figure 12B:
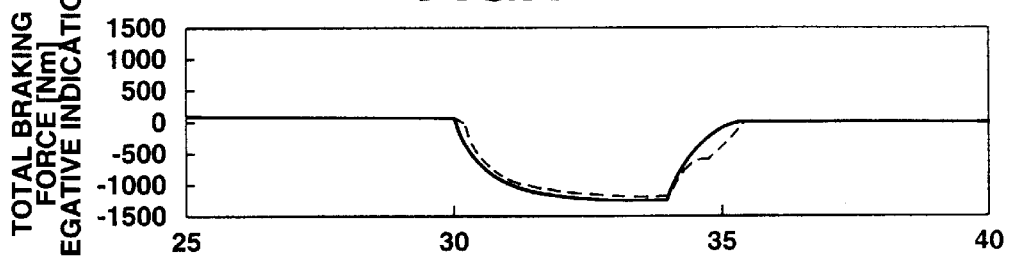
Figure 12C:
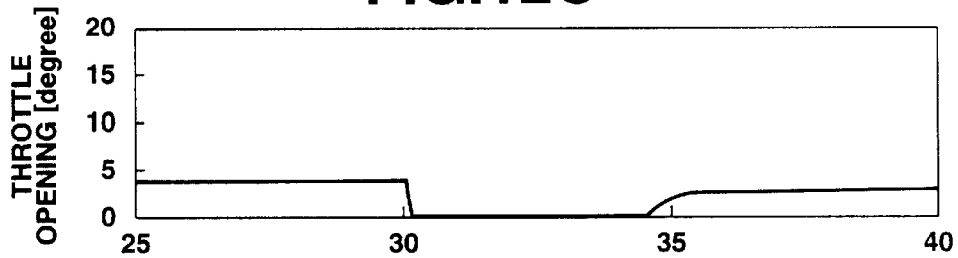
Figure 12D:
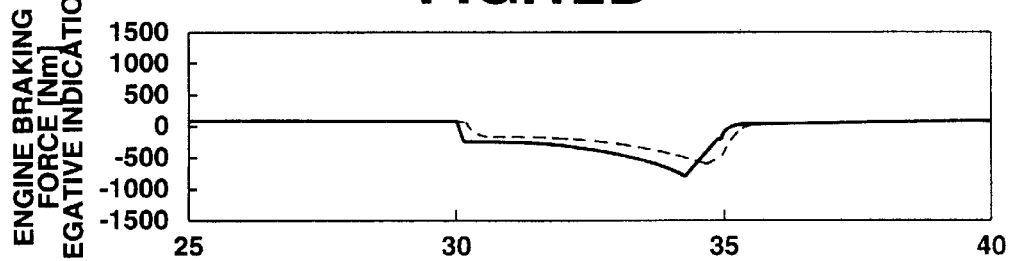
Figure 12E:
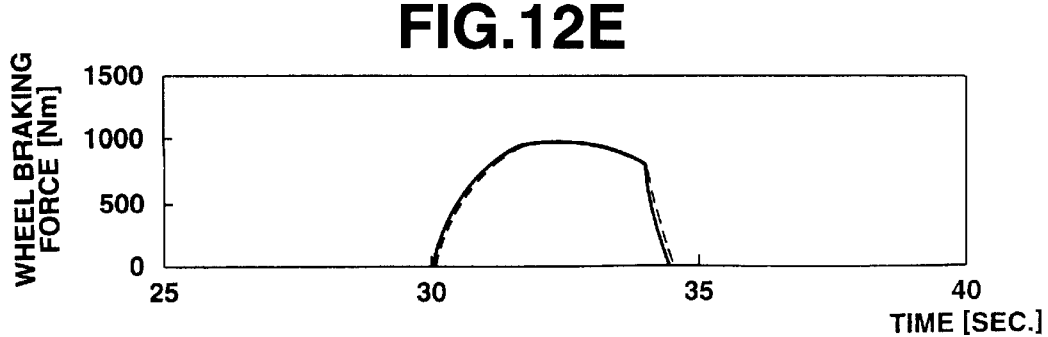
Figure 13A:
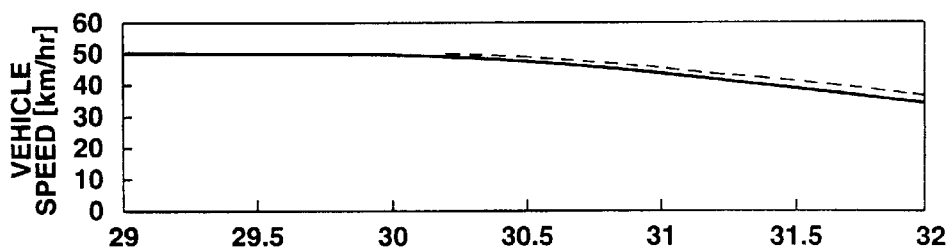
FIGS. 13A to 13E are partially enlarged timing charts of FIGS. 12A to 12E.
Figure 13B:
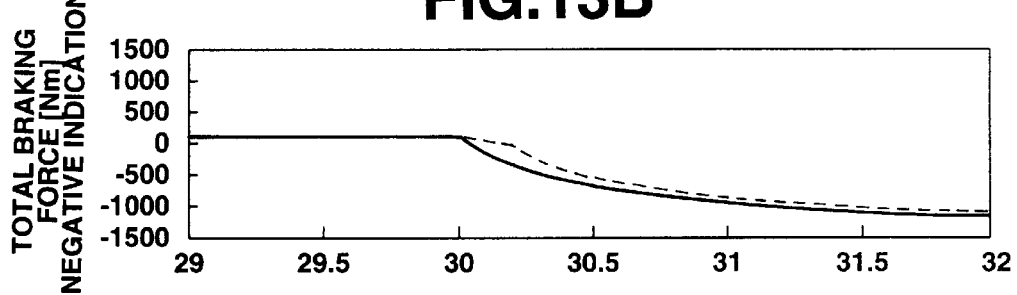
Figure 13C:
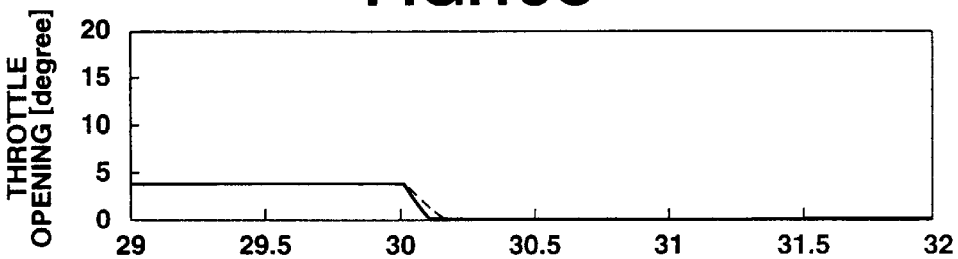
Figure 13D:
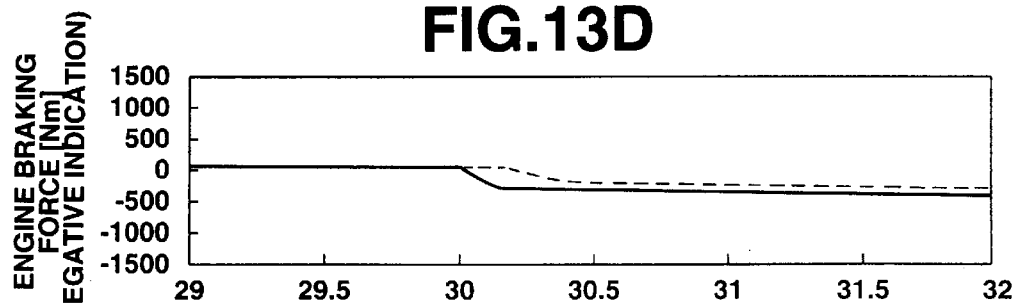
Figure 13E:
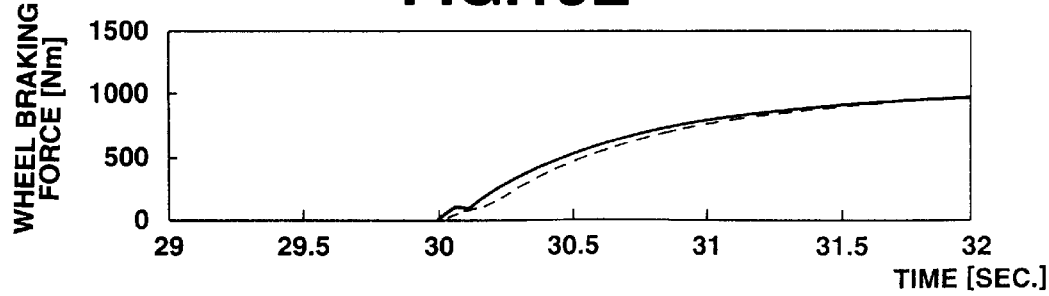

On the other hand, at the step S23 of the flowchart of FIG. 6, the engine braking force $T_{E-BRK}$ corresponding to the target throttle opening TVO* is calculated upon taking account of whether the fuel cut operation is executed or not. Since the target throttle opening TVO* has been calculated upon taking account of the response delay of the engine output when the target engine torque (braking force) Td$_{-E}$* is calculated, the engine braking force $T_{E-BRK}$ according to the target throttle opening TVO* is obtained upon taking account of the engine output response delay. Further, at the step S24 of the flowchart of FIG. 6, the engine braking force $T_{E-BRK}$ is corrected by the response dead time, which is a time period until the engine braking force operating time. The fast component Td$_{-FST}$* of the target total braking force is obtained by subtracting the corrected engine braking force $e^{tds} \cdot T_{E-BRK}$ from the target total braking force Td*, and is then employed as the target wheel braking force $T_{BRK}^*$. At the steps S25 to S27, the target brake fluid pressure $P_{BRK}^*$ is calculated according to the target wheel braking force $T_{BRK}^*$. In FIGS. 10D and 11D, the dotted line denotes the actual engine braking force that includes the response dead time. In FIGS. 10E and 11E, the continuous line denotes the target wheel braking force $T_{BRK}^*$. The phenomenon that the actual wheel braking force denoted by a dotted line in FIGS. 10E and 11E delays little with respect to the target value is caused by dynamics of the actuators including the brake fluid pressure actuator unit 2.

In this embodiment, during a time period necessary for operating an actual engine braking force with respect to the target engine brake force $T_{E-BRK}^*$, the target wheel brake force $T_{BRK}^*$ quickly and largely increases. Particularly, the target total braking force follow-up characteristic is preferable ensured at an initial period of the braking as shown in FIG. 11. As to the throttle opening during this period, a gradient of the target throttle opening TVO* changes just after the time 30 second. That is, the result that the absolute value |Td'*| of the change rate of the target force becomes greater than the predetermined value |Td'*$_0$| at the early period of this operation, and that the slow component Td$_{-SLW}$* (of the change rate of the target force) is exchanged to the filter treated value from the target total braking force Td* represents that the target total braking force follow-up characteristic at the initial period of the braking force control is improved.

Next, the manner of operation of a conventional braking force control system will be discussed with reference to time charts of FIGS. 12A–12E and 13A–13E. Elements and the simulation condition employed in this simulation of the conventional braking force control system are the same as those of the simulation of FIGS. 10A–10E and 11A–11E.

This conventional braking force control does not include to classify a fast component and a slow component of the target total braking force and to take account of the response dead time of the engine braking force. That is, the target total braking force in the conventional control is simply divided into the engine braking force and the wheel braking force, and the shortage of the target engine braking force is compensated by the wheel braking force.

In this simulation of the convention control, the increase of the target total braking force obtained just after the time 30 second is small as compared with the simulation result of the braking force control system according to the present invention. This small increase results from the neglect of the response delay and the response dead time of the engine brake force. Consequently, the follow-up characteristic of the target total braking force at the initial period of the braking operation is not good in this simulation of the conventional control, but at the other period the follow-up characteristic of the target total braking force is good.

Particularly, during the period from the time 34 second to the time 35 second, wherein the wheel braking force takes zero, the time-series changes of the target total braking force and the actual total braking force are generally as same as those of the present invention. This results from that the target force employed in the simulation of the conventional control is returned to the value Td* from the slow component Td$_{-SLW}$* of the target force since the absolute value |Td'*| of the change rate of the target total braking force becomes smaller than the predetermined value |Td'*$_0$|. In this situation where no wheel braking force is required, if the target engine braking force Td$_{-E}$* is set based on the slow component Td$_{-SLW}$* of the target total braking force, the actual total braking force further delays with respect to the target total braking force.

Since the braking force control system according to the present invention is arranged to set the target wheel braking force $T_{BRK}^*$ on the basis of the fast component Td$_{-FST}$* of the change rate of the target total braking force and to control the wheel braking force of each wheel so as to achieve the target wheel braking force $T_{BRK}^*$, it is possible to achieve the fast component of the target total braking force, which can not be achieved by the engine braking force, by the wheel braking force. This improves the target value follow-up characteristic during a first half of the transient period where the target total braking force is changed and therefore the responsibility of the control is improved as a whole.

When the target values of the transmission ratio, the engine output and the engine braking force are set, if the absolute value |Td'*| of the change rate of the target force is greater than the predetermined value |Td'*$_0$| corresponding to the response speed of the actual value with respect to the target value, each target value is calculated on the basis of the slow component of the target total braking force. On the other hand, if not, each target value is set on the basis of the target total braking force. Therefore, when the change rate of the target total braking force is not greater than the response speed of the transmission ratio, the engine braking force corresponding to the force achieving the target total braking force is ensured while suppressing the unnecessary wheel braking force. On the other hand, when the target total braking force cannot be achieved only by controlling the engine braking force, the wheel braking force is also employed to achieve the target total braking force. This arrangement functions to improve the target value follow-up characteristic during the first half of the transient period where the target total braking force is changed.

Further, when the target values of the transmission ratio, the engine output and the engine braking force are determined, the braking force control system according to the present invention calculates the target values on the basis of the component obtained by converting the transmission ratio, the engine output and the engine braking force through the inverse response characteristic function of the respective control quantity responses. Therefore, it becomes possible to eliminate the delay by advancing each target value of each control quantity by the respective response delay amounts.

Further, since the braking force control system according to the present invention is arranged to extract the fast component $Td_{-FST}^*$ of the target total braking force as the target wheel braking force $T_{BRK}^*$ by subtracting the engine braking force obtained delaying according to the response dead time td of the engine braking force $TE_{-BRK}$ from the target total braking force Td*, it is possible to delay the engine braking force in the calculation process according to the response dead time of the actual engine braking force. Therefore, it is possible to add the wheel braking force determined based on the fast component of the target total braking force to the target total braking force component during the engine braking force inoperative period.

Additionally, since the braking force control system according to the present invention is arranged to control the engine braking force according to the transmission ratio controlled on the basis of the target transmission ratio C* and the throttle opening controlled based on the target throttle opening TVO*, it is possible to continuously control the engine braking force. Further, the control system according to the present invention is arranged to determine a final target wheel braking force $T_{BRK}^*$ when the target wheel braking force $T_{BRK}^*$ is not zero ($T_{BRK}^* \neq 0$) and only when the throttle opening TVO is smaller than the lower limit $TVO_0$. Therefore, by setting the lower limit $TVO_0$ at a value greater than zero, such as 80 degrees, it becomes possible to change the response speed of the actual total braking force so as to extend a target wheel braking force setting range where the wheel braking force operates. Further, since the braking force control system according to the present invention is arranged to calculate the engine braking force $T_{E-BRK}$ by multiplying the actual transmission ratio C and the torque amplifier ratio $N_I/N_E$ to the engine output, it is possible to take account of the response speed of the transmission ratio and to accurately obtain the engine braking force in the low speed range where the lockup control of the lockup converter 10 is not executed. Therefore, when the engine output is calculated, the actually outputable engine output is obtained by employing the target throttle opening TVO* limited by the lower limit. Accordingly, it becomes possible to accurately obtain the generable engine braking force by using the outputable engine output.

The throttle actuator 111 and the working fluid pressure control valve of the actuator unit 304 function as an engine braking force actuating means according to the present invention. The braking fluid pressure actuator unit 2 functions as a wheel braking force actuating means. The target vehicle speed setting device 12 and the step S11 of the program of FIG. 6 executed by the general control unit 8 function as a target total braking force setting means. The step S18 shown in FIG. 6 functions as a target transmission ratio setting means. The step S21 functions as a target engine output setting means. The step S23 functions as a engine braking force calculating means. The step S24 of FIG. 6 functions as a target total braking force high-frequency component extracting means and a target wheel braking force setting means. The steps S25 to S27 of FIG. 6 and the brake fluid pressure control unit 6 function as a wheel braking force control means. The step S18 and the CVT control unit 7 function as a transmission ratio control means. The step S22 of FIG. 6 functions as a target throttle opening calculating means. The step S22 and the engine control unit 5 function as a throttle opening control means.

Although the present embodiment according to the present invention has been shown and described to extract the slow component $Td_{-SLW}^*$ of the target total braking force by using the low-pass filter, it will be understood that a band-pass filter having a characteristic that passing frequencies thereof are slightly greater than the frequency of the low-pass filter. When such the slightly higher band pass filter is employed, the low-frequency side component of the target wheel braking force $T_{BRK}^*$, which component is constituted by a fast component $Td_{-FST}^*$ and is obtained by subtracting the engine braking force $T_{E-BRK}$ set based on the slow component $Td_{-SLW}^*$ of the target total braking force from the target total braking force Td*, is decreased. Therefore, the braking characteristic of the wheel braking force is set mild.

Although the embodiment according to the present invention has been shown and described such that each control unit is constituted by a microcomputer, it will be understood that the present invention is not limited to this construction and may be constituted by the combination of electronic calculating-circuits.

The entire contents of Japanese Patent Application No. 10-232852 filed on Aug. 19, 1998 in Japan are incorporated herein by reference.

Although the invention has been described above by reference to a certain embodiment of the invention, the invention is not limited to the embodiment described above. Modifications and variations of the embodiment described above will occur to those skilled in the art, in light of the above teaching.

What is claimed is:

1. A braking force control system for a vehicle, comprising:
   a vehicle operating condition detector detecting an operating condition of the vehicle;
   an engine braking force actuator varying an engine braking force;
   a wheel braking force actuator varying a wheel braking force applied to each wheel; and
   a controller connected to said vehicle operating condition detector, said engine braking force actuator and said wheel braking force actuator,
   said controller determining a target total braking force on the basis of the vehicle operating condition, said controller determining a target transmission ratio and a target engine output on the basis of the target total braking force, said controller calculating an engine braking force on the basis of the vehicle operating condition, said controller extracting a fast component of the target total braking force which performs a fast rate of change of the target total braking force, said controller determining a target wheel braking force on the basis of the fast component, said controller controlling said wheel braking force actuator so as to correspond the wheel braking force to the target wheel braking force.

2. The braking force control system as claimed in claim 1, wherein said vehicle operating condition detector detects a transmission ratio of a continuously variable transmission (CVT) and an engine output of an engine connected to the CVT.

3. The braking force control system as claimed in claim 1, wherein said controller includes a general control unit, an engine control unit, a brake fluid pressure control unit, a CVT control unit and a target vehicle speed setting apparatus.

4. The braking force control system as claimed in claim 1, wherein the fast component is obtained by subtracting a corrected engine braking force obtained by correcting the engine braking force by its response dead time from the target total braking force.

5. The braking force control system as claimed in claim 1, wherein said controller extracts a component of the target total braking force according to the change rate of the target total braking force, the target transmission ratio being calculated on the basis of a slow component of the target total brake force when the change rate of the target total braking force is faster than a response speed of a transmission ratio to the target transmission ratio, the target transmission ratio being calculated on the basis of the target total braking force when the change rate of the target total braking force is slower than the response speed of the transmission ratio with respect to the target transmission ratio.

6. The braking force control system as claimed in claim 3, wherein said controller calculates the target transmission ratio by using a function which represents an inverse response characteristic of a response of the actual transmission ratio to the target transmission ratio, said controller calculating the target transmission ratio on the basis of a transformed component which is obtained by transforming the response of the transmission ratio by the inverse response function.

7. The braking force control system as claimed in claim 1, wherein said controller extracts a component of the target total braking force according to the change rate of the target total braking force, the target engine output being calculated on the basis of a slow component of the target total braking force when the change rate of the target total braking force is faster than a response speed of the engine output with respect to the target engine output, the target engine output being calculated on the basis of the target total braking force when the change rate of the target total braking force is slower than a response speed of the actual engine output with respect to the target engine output.

8. The braking force control system as claimed in claim 7, wherein said controller calculates the target engine output by using a function which represents an inverse response characteristic of a response of the engine output with respect to the target engine output, said controller calculating the target engine output on the basis of a component which is obtained by transforming the extracted component by means of the inverse response characteristic function.

9. The braking force control system as claimed in claim 5, wherein said controller extracts a component, which is slower than or equal to the response speed of the engine braking force, as a component of the target total braking force according to the change rate of the target total braking force.

10. The braking force control system as claimed in claim 1, wherein said controller extracting the fast component of the target total braking force by subtracting an engine braking delayed according to the response dead time of the engine braking force from the target total braking force.

11. The braking force control system as claimed in claim 1, wherein said engine braking force actuator is controlled by a transmission ratio controlling means for controlling the transmission ratio on the basis of the target transmission ratio, a target throttle opening calculating means for calculating a target throttle opening on the basis of the target engine output, and a throttle opening controlling means for controlling a throttle opening on the basis of the target throttle opening.

12. The braking force control system as claimed in claim 1, wherein said controller determines the target wheel braking force when a distribution of the target wheel braking force is not zero and when the throttle opening is smaller than or equal to a predetermined value.

13. The braking force control system as claimed in claim 1, wherein said controller calculates a torque amplifying ratio of a torque converter and calculates the engine braking force by multiplying the engine output by the transmission ratio and the torque amplifying ratio.

14. The braking force control system as claimed in claim 1, wherein said controller controls the wheel braking force by transforming the target wheel braking force into a target brake fluid pressure.

15. The braking force controlling system as claimed in claim 9, wherein said controller extracts the component of the target total braking force according to the change rate of the target total braking force by means of a low-pass filter which extracts a low-frequency component of the target total braking force.

16. The braking force control system as claimed in claim 5, wherein said controller extracts the component of the target total braking force according to the change rate of the target total braking force by means of a band-pass filter which extracts a frequency component of the target total braking force.

17. The braking force control system as claimed in claim 3, wherein the engine control unit controls control-quantities of an engine to achieve the target throttle opening, the CVT control unit controlling control-quantities of a continuously variable transmission (CVT) to achieve the target transmission ratio, the brake fluid pressure control unit controlling control-quantities of a brake pressure actuator unit to achieve the target brake fluid pressure, the general control unit receiving a target vehicle speed from the target vehicle speed setting apparatus.

18. A braking force control system for a vehicle, the vehicle including an engine system for applying driving force and braking force to wheels and a wheel brake system applying braking force to the wheels, the braking force controlling system comprising:

a vehicle operating condition detecting means for detecting a vehicle operating condition;

an engine braking force actuating means for varying engine braking force;

a wheel braking force actuating means for varying a braking force of each wheel;

a target total braking force setting means for setting a target total braking force according to the vehicle operating condition;

a target transmission ratio setting means for setting a target transmission ratio on the basis of the vehicle operating condition;

a target engine output setting means for setting a target engine output on the basis of the target total braking force;

an engine braking force calculating means for calculating an engine braking force on the basis of the vehicle operating condition;

a target total braking force fast component extracting means for extracting a fast component of the target total braking force which performs a fast rate of change of the target total braking force;

a target wheel braking force setting means for setting a target wheel braking force on the basis of the fast component; and a wheel braking force controlling means for controlling said wheel braking force actuating means so as to achieve the target total braking force.

19. A method for controlling braking force of a vehicle, the vehicle including an engine system for applying motive power to wheels and a brake system applying braking force to the wheels, the method comprising:

setting a target total braking force according to a vehicle operating condition;

setting a target transmission ratio according to the target total braking force;

setting a target engine output according to the target total braking force;

calculating an engine braking force on the basis of the vehicle operating condition;

extracting a fast component of the target total braking force, which performs a fast rate of change of the target total braking force, on the basis of the calculated engine braking force;

setting a target wheel braking force on the basis of the fast component; and controlling a wheel braking force actuator so as to correspond the wheel braking force to the target wheel braking force.

* * * * *